July 29, 1952 M. J. MORRIS 2,605,351

TELEVISION RECEIVER CHASSIS

Filed May 18, 1950 2 SHEETS—SHEET 1

INVENTOR.

MYRON J. MORRIS

BY

Theodore Hafner

ATTORNEY

TELEVISION RECEIVER CHASSIS

Filed May 18, 1950

INVENTOR.
MYRON J. MORRIS
BY
Theodore Hafner
ATTORNEY

Patented July 29, 1952 2,605,351

UNITED STATES PATENT OFFICE 2,605,351

TELEVISION RECEIVER CHASSIS

Myron J. Morris, Yonkers, N. Y., assignor to Tele King Corporation, a corporation of New York Application May 18, 1950, Serial No. 162,640

6 Claims. (Cl. 178—7.5)

This invention relates to a supporting box or chassis for electronic apparatus especially of the cathode ray tube type such as television receivers.

In the past, the mounting of cathode ray tubes and their control elements has been found cumbersome and costly due to the peculiar shape of the tube and the complexity of the necessary connections.

One of the objects of the invention is a chassis permitting easy assembly in a minimum of space while reducing to a minimum mechanical and electrical interference between certain sensitive parts of the equipment supported on the chassis.

A more specific object of this invention is a chassis having a cathode ray tube substantially directly mounted or supported thereon, thus providing a minimum of height.

A further specific object of the invention is to form the chassis in such a way that while the circuit elements themselves are supported substantially inside and/or outside thereof, its walls are built to form protective screens between certain sensitive portions or parts of the apparatus.

Another object of the invention is to form the supporting body of said chassis itself of a minimum of parts of metal partly integral with each other and partly easily attachable to each other by screwing, bolting, welding, or the like.

Still another object of this invention is to provide a supporting body for a quadrangular type of cathode ray tube where the front or screen portion of the tube is supported substantially merely on edge portions of its front base while the intermediate or central portions of this front base extend over a cavity or depression in the supporting body. Such cavity or depression is adapted to receive and support thereon certain circuit elements such as tubes or other parts of the apparatus which ought to be easily accessible.

These and other objects of the invention will be more fully apparent from the drawings annexed hereto.

Figures 1, 2:
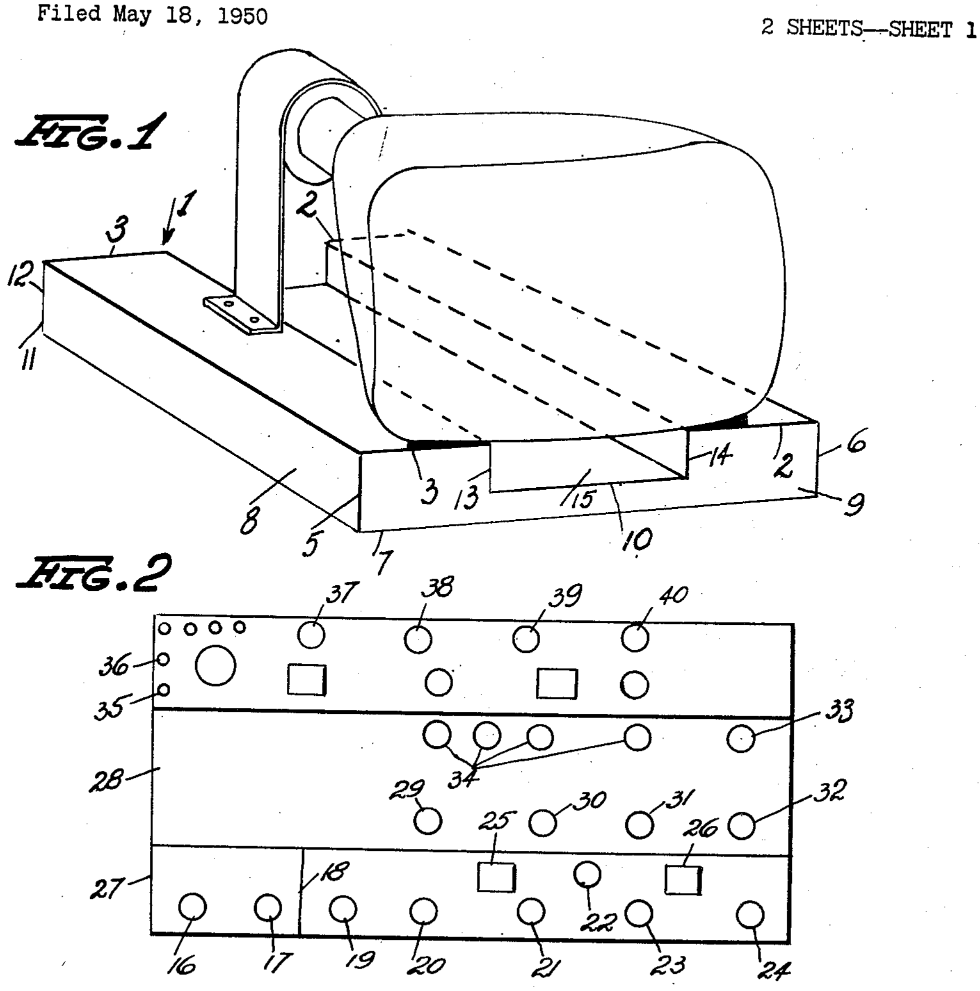
Figure 1 represents perspectively the body of a television receiver chassis embodying certain features of the invention.
Figure 2 represents a schematical layout of the top surface of such a chassis in which the projected disposition of certain circuit elements is diagrammatically indicated.

In Figure 1, part 1 represents a channel shaped sheet metal piece having horizontal flaps 2 and 3 to which vertical side pieces 5, 6 are bolted.

At 7 there will be attached a front piece (not shown here) of sheet metal of substantially quadrangular configuration extending over both side wings 8, 9 and also over central depression 10.

At 11, a back cover which is not of quadrangular shape will be attached. This back cover (not shown here) consists of a channel shaped piece of sheet metal following more or less closely the outline determined by side wings 8, 9 and depression 10 of the chassis.

One of the side portions of this back plate may be cut out to permit a transformer or some other rather heavy heat-producing element of the circuit to extend therethrough with part of its winding projecting therefrom to facilitate ventilation and heat conduction.

Side flap 3 (or 2 or both) of top plate 1 may also be provided with perforations further to enhance ventilation of the parts contained in the side wing (8, 9) of the chassis formed underneath flap 3 (or 2 or both).

Side walls 13, 14 of depression 10, which preferably are formed of one piece with the depressed center space 15 of top plate 1 form an electric screen for at least some of the circuit elements contained in side wings 8, 9, respectively.

Center portion 15, on its top, supports tubes, and the like circuit elements which are normally required to be easily accessible.

Similar considerations apply to spaces 8, 9 and flaps 3, 2, respectively, the latter supporting on the top thereof tubes, transformers, and the like and underneath thereof other circuit elements such as resistors, condensers, chokes, transformers, which are less accessible because less subject to wear and replacement, and of course all interconnecting wiring.

In Figure 2, which represents a diagrammatical layout of the top surface of the chassis of a television receiver, oscillator and R. F. mixer tubes appear to be arranged at 16, 17, preferably in a cutout of the chassis schematically indicated at 18, and at an angle with respect to the vertical. Tubes 16, 17 are supported on a channel selecting mechanism or tuner (not shown) which is also supported on this chassis inside or underneath thereof with its shaft projecting through its front panel.

Outlets for intermediate frequency amplifiers are provided at 19, 20, 21. Sound discrimination is served by tube 22; video detection and automatic gain control by tube 23 and an associated video amplifier is indicated at 24.

A pair of sound transformers are indicated at points 25, 26. All these circuit elements are supported on the top surface of side wing 27 of the chassis.

The central depression 28 of the chassis supports—upwardly projecting therefrom—video and audio amplifier tubes 29, 30; D. C. restorer and sync. clipper 31, horizontal oscillator 32 and horizontal phase detector 33 as well as a number of electrolytic condensers 34.

The remaining side wing 35 of the chassis is provided with ventilation openings or perforations 36 and supports thereon more or less important, bulky, and electrically sensitive equipment such as horizontal detector 37, high voltage rectifier 38, horizontal rectifier 39, and main power rectifier 40, all projecting from the top surface thereof.

Underneath side wing 35 there are attached, in addition to a number of circuit elements and connections, a horizontal line transformer and a power transformer (both not shown here) in appropriate positions as will be described further below.

Figure 3:
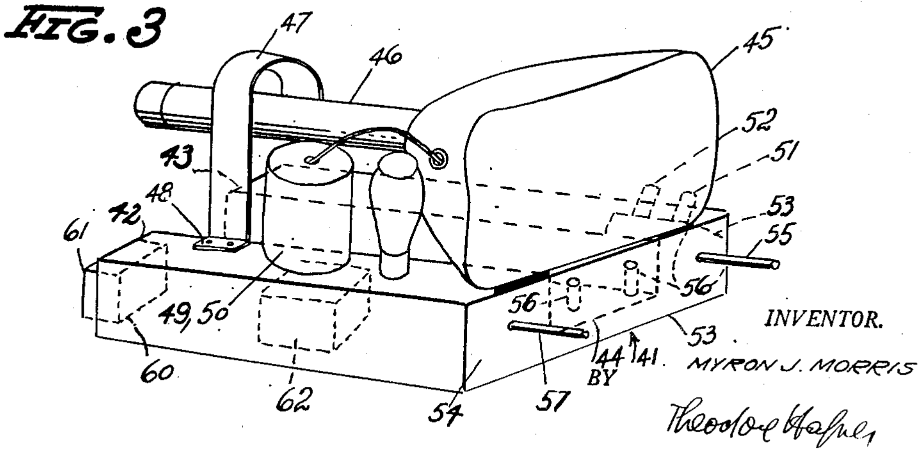
Figures 3, 4, 5 and 6 represent perspectively in one front view, two rear views and one bottom view, a television chassis showing a certain number of circuit elements more or less important for the purpose of this invention.

Figure 3 represents a perspective side view of a television chassis assembled with some of its elements. 41 represents the body of the chassis having elevated side portions 42, 43 and a depressed central portion 44.

Cathode ray tube 45 is supported on main portions 42, 43 bridging central portion 44; its neck 46 is supported (in a manner not shown here) on a bracket 47 which also encloses deflection coils (not shown) and is attached at points 48 to wings 42, 43, straddling central depression 44.

Horizontal output tube 49 is arranged under protecting cover 50 attached to the top of side wing 42.

R. F. mixer and oscillator output tubes 51, 52 are shown to be attached to and supported on channel selector or tuner 53, which in turn is supported on front panel 54 at least partially, with its shaft 55 projecting therefrom. Some of the tubes supported on central depression 44 are shown at 56.

At least one control shaft 57 is shown to extend from front panel 54 at wing portion 42 and connected to one of the circuit elements inside that wing portion.

This wing 42 also supports enclosed therein a power transformer 60 with a portion of its winding 61 projecting from the rear end of the chassis.

At an intermediate point of wing space 42, there is arranged a horizontal circuit transformer schematically indicated at 62.

Figure 4:
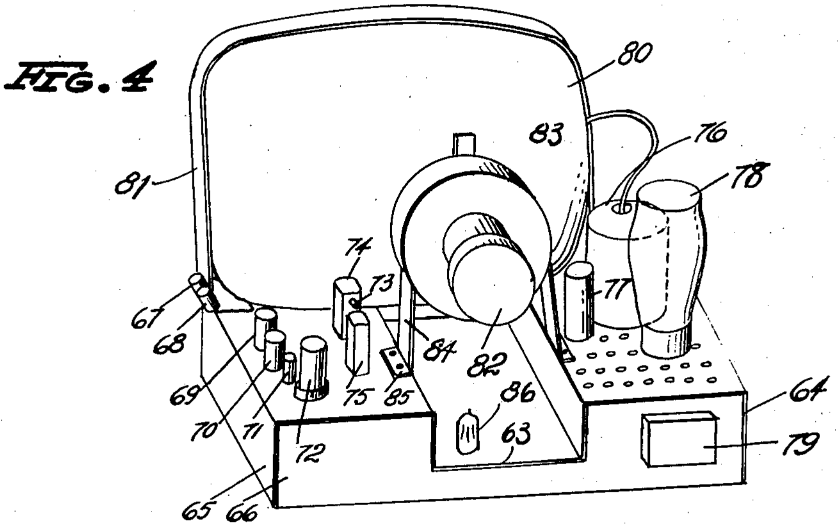

Figure 4 shows a perspective rear view on a chassis consisting of a central sheet metal base 63 and side sheets 64, 65, a front sheet (not shown) and a rear sheet 66.

Electronic tubes are indicated at 67 through 73, transformers at 74, 75, all on the left wing of the chassis.

Tubes 76, 77, 78 are arranged at the right and perforated wing of the chassis with power transformer winding 79 projecting from the rear end of that wing.

A cathode ray tube 80 is supported on the front end of the chassis, preferably on rubber cushions (not shown here) and fixed in its position by a band 81 attached to the side walls of the chassis.

Neck 82 of tube 80 is surrounded by a deflection coil assembly 83 and is supported together with these deflection coils on the straddling bracket 84, which is attached by screws 85 or the like to the side wings of the chassis.

In the central depression 63 there are supported several tubes, one of which is shown at 86, condensers and other elements which appropriately require such disposition.

Figures 5, 6:
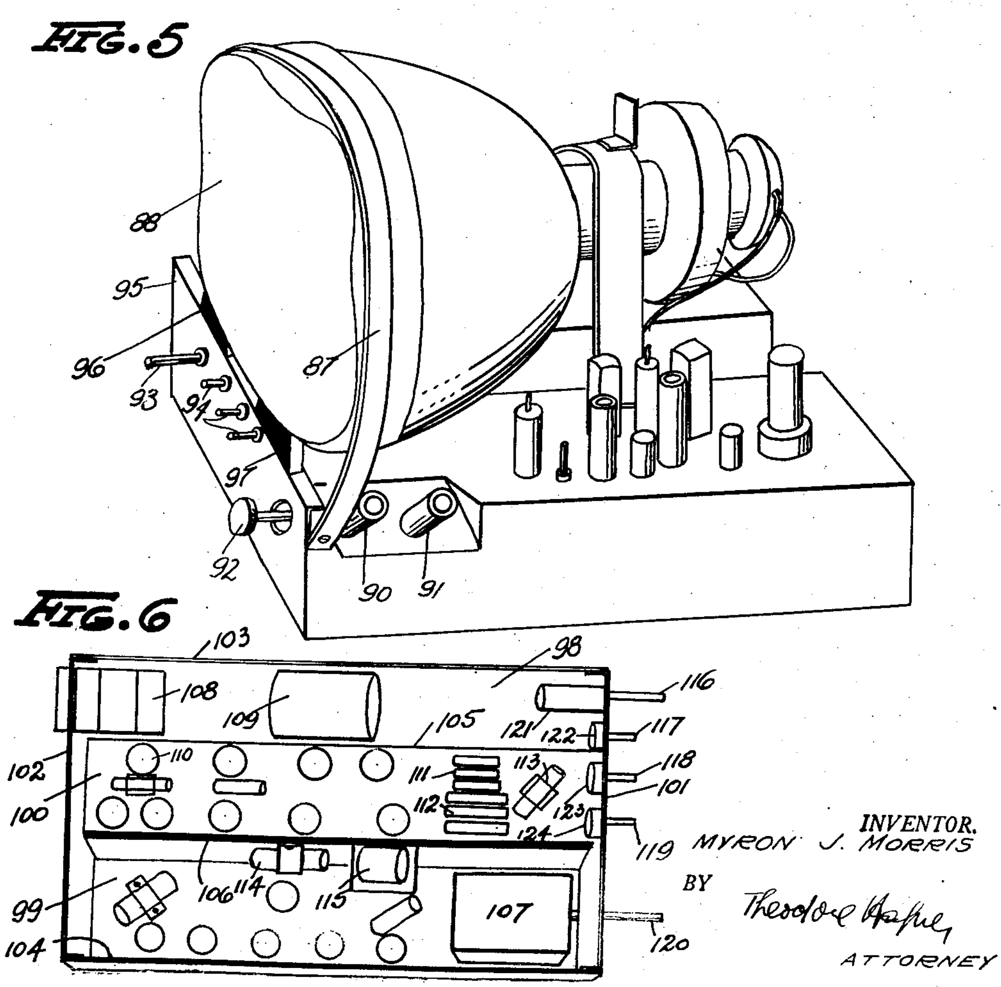

Figure 5 shows a perspective side view illustrating the band 87 attaching tube 88 to the chassis, and the angular position of oscillator and mixer tubes 90, 91, supported on a channel selector (not shown here) which in turn is supported on the chassis and inside thereof, the control shaft of which is shown at 92.

A number of control shafts 93, 94 are also shown to project from front panel 94.

The invention is not limited to the particular construction of a television chassis and its composition of several parts shown and described nor to the specific arrangement of tubes, circuit elements and connections shown and described, but may be applied without exceeding its scope to all forms of chassis for all types of apparatus within the skill of anyone familiar with the design of electronic apparatus, their assembly and operation.

Tube 88 is mounted on rubber cushions 96, 97.

Figure 6 shows a perspective view onto the bottom of a television receiver chassis with parts of its circuit elements and connections attached thereto.

The three compartments formed by the two side wings and the central depression are indicated at 98, 99, 100, respectively; front and back panels are shown at 101, 102; outer side panels appear at 103, 104; the inner side panels which in accordance with the invention also serve as electric screens or the like, and which are preferably integral with the central depression, are indicated at 105, 106, respectively.

The horizontal surfaces 98, 99, 100 support above and underneath thereof the far greater number of all the circuit elements and connections of the television receiver.

Space 99 also encloses at 107 the channel selector or tuner while space 98 encloses at least partially power transformer 108 and horizontal transformer 109.

Depressed portion 100 is sufficiently low to permit on the top thereof placement of tubes, condensers, and the like to fit into the space thereabove and beneath the cathode ray tube (not shown). Portion 100, however, is not low enough to prevent arrangement thereunder of a great number of circuit arrangements, resistors, condensers, schematically drawn at 110, 111, 112, 113, and associated wiring underneath depression 100, at a sufficient distance from the floor of the chassis.

Inner walls 105, 106, may also serve to support certain circuit elements such as small transformers and condensers, schematically shown at 114, 115.

Front panel 101 may serve in well known manner to support control shafts 116, 117, 118, 119, 120, and their associated potentiometers, tuning coils, condensers, and other tuning or control elements suitably attached thereon, and schematically shown at 121, 122, 123, 124, and 107, respectively.

The disposition of the circuit elements beneath and also above the supporting chassis is a matter determined not only by the form of the chassis in accordance with the invention but also by the structure of circuits used, type of assembly contemplated, and generally by mechanical, electrical and economical requirements familiar to any electronic engineer and applicable to the invention without exceeding the scope thereof.

I claim:

1. Chassis for television receiver comprising a sunken central portion for supporting circuit components and elevated side portions, and a television tube supported on said side portions, with its face bridging said sunken portions spaced therefrom to enable components to be mounted on the sunken portion of the chassis below any part of the picture tube.

2. Chassis according to claim 1, wherein said elevated side portions have inner walls forming said sunken central portion and shielding the interior of said elevated side portions.

3. Chassis according to claim 1, wherein said elevated side portions have inner walls forming said sunken central portion and shielding the interior of said elevated side portions, said inner walls forming an integral part of said sunken central portion.

4. Chassis according to claim 1, wherein said elevated side portions have inner walls forming said sunken central portion and shielding the interior of said elevated side portions, said inner walls forming an integral part of said sunken central portion and said side portions have outer walls attached to said side portions.

5. Chassis according to claim 1, comprising a front panel extending over both side and central portions, covering the depression formed by said sunken central portion and a back panel extending over both side and central portions, leaving open the depression formed by said sunken central portion.

6. Chassis according to claim 1, wherein there is a transformer mounted in one of said side portions and channel selector means in the other of said side portions, said transformer having windings projecting from its associated side portion at one end thereof and said channel selector means having tubes also projecting from its associated side portion, the transformer projection and channel selector extending from its associated side portions at the opposite end thereof.

MYRON J. MORRIS.

REFERENCES CITED

The following references are of record in the file of this patent:

UNITED STATES PATENTS

| Number | Name | Date |
|---|---|---|
| 2,458,365 | Fyler | Jan. 4, 1949 |
| 2,484,345 | Hinz | Oct. 11, 1949 |

FOREIGN PATENTS

| Number | Country | Date |
|---|---|---|
| 866,438 | France | Aug. 12, 1941 |

OTHER REFERENCES

Loren Berichte, #3, September 1937; page 116.

Skyrider, Rider's Television Manual, vol. 4, Skyrider, pp. 4–8.

Rider's Television Manual, vol. 4, National TV, pp. 4–3.

Rider's Television Manual, vol. 4, Hallicrafters TV, pages 4–11; Montgomery Ward TV, pages 4–9; Techmaster TV, pages 4–2. (Copy in Scientific Library.) (Copyright date of Rider's Television Manual, vol. 4, November 24, 1949.)